US007272539B2

United States Patent
Sano

(10) Patent No.: US 7,272,539 B2
(45) Date of Patent: Sep. 18, 2007

(54) REPRESENTATION GENERATION METHOD, REPRESENTATION GENERATION DEVICE, AND REPRESENTATION GENERATION SYSTEM

(76) Inventor: Yoshihiko Sano, 2014-176, Akitsu Tojyo-cho Kato-gun, Hyogo (JP) 673-1302

(*) Notice: Subject to any disclaimer, the term of this patent is extended or adjusted under 35 U.S.C. 154(b) by 0 days.

(21) Appl. No.: 10/508,517

(22) PCT Filed: Mar. 20, 2003

(86) PCT No.: PCT/JP03/03407

§ 371 (c)(1),
(2), (4) Date: Sep. 21, 2004

(87) PCT Pub. No.: WO03/081572

PCT Pub. Date: Oct. 2, 2003

(65) Prior Publication Data

US 2006/0025968 A1 Feb. 2, 2006

(30) Foreign Application Priority Data

Mar. 25, 2002 (JP) ............................ 2002-084623

(51) Int. Cl.
*G06F 15/00* (2006.01)

(52) U.S. Cl. ...................... 702/189; 702/122; 702/123; 702/124; 702/125; 702/190; 379/142.04

(58) Field of Classification Search ................ 702/189, 702/122–125, 190; 455/415, 567; 84/609; 379/142.04, 142.06, 142.1, 142.15, 372–372.06
See application file for complete search history.

(56) References Cited

U.S. PATENT DOCUMENTS 5,805,677 A 9/1998 Ferry et al.

(Continued)

FOREIGN PATENT DOCUMENTS

GB 2343586 5/2000

(Continued)

*Primary Examiner*—Marc S. Hoff
*Assistant Examiner*—Phuong Huynh
(74) *Attorney, Agent, or Firm*—Snider & Associates; Ronald R. Snider

(57) ABSTRACT

Unique representation, such as music or image full of originality, is generated in relation to a specific data sequence such as a telephone number.

A music generation server 10 is provided with a material table TA in which material data associated with music phrases are provided in correspondence with the digits of the telephone number and the numerals thereof given at the respective digits, and such server is connected to a user's terminal, such as a PC 50 or a cellular phone 56. When a specific data acquisition program 30 is executed to acquire a telephone number as a specific data sequence from a user, a material data extraction program 32 is executed to make reference to the foregoing material table TA and extract therefrom a particular material data MD corresponding to the acquired telephone number. Then, a generation program 34 is executed to arrange such material data MD in a predetermined order and thereby generate one completed piece of music. A data of so generated music is transferred or transmitted by a transfer program 42 to the user's terminal through an Internet 70, and then reproduced as a melody of incoming call to be ringed in the cellular phone for example.

40 Claims, 10 Drawing Sheets

U.S. PATENT DOCUMENTS

| | | | | |
|---|---|---|---|---|
| 6,632,992 | B2 * | 10/2003 | Hasegawa | 84/609 |
| 6,999,752 | B2 * | 2/2006 | Fukaya | 455/412.1 |
| 2001/0041600 | A1 * | 11/2001 | Becker et al. | 455/567 |

FOREIGN PATENT DOCUMENTS

| | | |
|---|---|---|
| JP | 05-219151 | 8/1993 |
| JP | 07-152313 | 6/1995 |
| JP | 10-233822 | 9/1998 |
| JP | 11-073186 | 3/1999 |
| JP | 11-203456 | 7/1999 |
| JP | 2000-197125 | 7/2000 |
| JP | 2000-295374 | 10/2000 |
| JP | 2001-045105 | 2/2001 |
| JP | 2001-265337 | 9/2001 |
| JP | 2001-318677 | 11/2001 |
| JP | 2002-023607 | 1/2002 |
| JP | 2002-073044 | 3/2002 |
| JP | 2002-162967 | 6/2002 |
| JP | 2002-162968 | 6/2002 |
| JP | 2003-044046 | 2/2003 |
| WO | WO96/27974 | 9/1996 |

* cited by examiner (A)

TA MD

| NUMBER OF DIGITS / NUMERAL | 1ST DIGIT | 2ND DIGIT | 3RD DIGIT | 4TH DIGIT | 5TH DIGIT | 6TH DIGIT | 7TH DIGIT | 8TH DIGIT | 9TH DIGIT | 10TH DIGIT | 11TH DIGIT |
|---|---|---|---|---|---|---|---|---|---|---|---|
| 0 | 1-0 | 2-0 | 3-0 | 4-0 | 5-0 | 6-0 | 7-0 | 8-0 | 9-0 | 10-0 | 11-0 |
| 1 | 1-1 | 2-1 | 3-1 | 4-1 | 5-1 | 6-1 | 7-1 | 8-1 | 9-1 | 10-1 | 11-1 |
| 2 | 1-2 | 2-2 | 3-2 | 4-2 | 5-2 | 6-2 | 7-2 | 8-2 | 9-2 | 10-2 | 11-2 |
| 3 | 1-3 | 2-3 | 3-3 | 4-3 | 5-3 | 6-3 | 7-3 | 8-3 | 9-3 | 10-3 | 11-3 |
| 4 | 1-4 | 2-4 | 3-4 | 4-4 | 5-4 | 6-4 | 7-4 | 8-4 | 9-4 | 10-4 | 11-4 |
| 5 | 1-5 | 2-5 | 3-5 | 4-5 | 5-5 | 6-5 | 7-5 | 8-5 | 9-5 | 10-5 | 11-5 |
| 6 | 1-6 | 2-6 | 3-6 | 4-6 | 5-6 | 6-6 | 7-6 | 8-6 | 9-6 | 10-6 | 11-6 |
| 7 | 1-7 | 2-7 | 3-7 | 4-7 | 5-7 | 6-7 | 7-7 | 8-7 | 9-7 | 10-7 | 11-7 |
| 8 | 1-8 | 2-8 | 3-8 | 4-8 | 5-8 | 6-8 | 7-8 | 8-8 | 9-8 | 10-8 | 11-8 |
| 9 | 1-9 | 2-9 | 3-9 | 4-9 | 5-9 | 6-9 | 7-9 | 8-9 | 9-9 | 10-9 | 11-9 |

| | |
|---|---|
| TELEPHONE NUMBER | : 03-5447-5166 |
| HOW TO ARRANGE THE TELEPHONE NUMBER | : IT SHOULD BE ARRANGED IN NORMAL READING DERECTION. ⇨ 03-5447-5166 |
| REPRESENTATION MANNER | : [1-0] - [2-3] - [3-5] - [4-4] - [5-4] - [6-7] - [7-5] - [8-1] - [9-6] - [10-6] |

(B)

| | |
|---|---|
| TELEPHONE NUMBER | : 03-5447-5166 |
| HOW TO ARRANGE THE TELEPHONE NUMBER | : IT SHOULD BE ARRANGED IN BACKWARD READING DERECTION. ⇨ 6615-7445-30 |
| REPRESENTATION MANNER | : [1-6] - [2-6] - [3-1] - [4-5] - [5-7] - [6-4] - [7-4] - [8-5] - [9-3] - [10-0] |

(C)

| | |
|---|---|
| TELEPHONE NUMBER | : 090-3260-4289 |
| HOW TO ARRANGE THE TELEPHONE NUMBER | : THE CODE 090 SHOULD BE OMITTED, AND AN INITIAL NUMERAL OF THE REMAINING DIALING CODE PORTION BE SET AT 1ST DIGIT OF THE TELEPHONE NUMBER. ⇨ 3260-4289 (NAMELY, THE FIRST NUMERAL "3" BE SET AS THE 1ST DIGIT, AND ALL REMAINING NUMERALS BE READ THEREFROM IN SEQUENCE.) |
| REPRESENTATION MANNER | : [1-3] - [2-2] - [3-6] - [4-0] - [5-4] - [6-2] - [7-8] - [8-9] |

(D)

| | |
|---|---|
| TELEPHONE NUMBER | : 075-549-5162 |
| HOW TO ARRANGE THE TELEPHONE NUMBER | : THE LOCAL AREA CODE SHOULD BE OMITTED, AND AN INITIAL NUMERAL OF REMAINING DIALING CODE PORTION BE SET AT 1ST DIGIT OF THE TELEPHONE NUMBER, SO THAT THE REMAINING DIALING CODE PORTION IS LEFT AND ARRANGED IN NORMAL READING DIRECTION. |
| REPRESENTATION MANNER | : [BEGINNING WITH A MELODY RELATED TO THE CODE "075"] [1-5] - [2-4] - [3-9] - [4-5] - [5-1] - [6-6] - [7-2] |

| NUMERAL \ DIGIT NO | 10TH DIGIT | 9TH DIGIT | 8TH DIGIT | 7TH DIGIT | (9TH DIGIT) | 6TH DIGIT | 5TH DIGIT | (8TH DIGIT) | 4TH DIGIT | 3RD DIGIT | 2ND AND 1ST DIGIT |
|---|---|---|---|---|---|---|---|---|---|---|---|
| 0 | Mukashi aru tokoroni (Once upon a time, at a certain place,) | Ojiisan to (an old man and) | Obahsan ga (an old woman) | Sunde imasita. (had lived.) | Ojiisan wa (The old man) | Yama e (to a mountain) | shibakari ni (to mow lawn) | Obahsan wa (the old woman) | kawa e (to a river) | sentaku ni (for washing) | dekakemashita. (went out.) |
| 1 | Obake-yashiki ni (To a haunted house) | Otohsan to (father and) | Okahsan ga (mother) | asobi ni kimashita. (came for fun.) | Otohsan wa (The father) | gakkou e (to a school) | souji ni (for cleaning) | Okahsan wa (the mother) | Kouyen e (to a park) | asobi ni (for diver-sion) | dekaketorude. (have gone out.) (This is spoken in Kansai dialect and accent in Japan) |
| 2 | Aru hareta hi (On a fine day.) | Watashi to (I and) | Suzuki-san ga (Mr.Suzuki) | doraibu ni ikima-shita. (went for a drive.) | Watashi wa (I) | shokudo e (to a rest-aurant) | tabe ni (to have a meal) | Suzuki-san wa (Mr.Suzuki) | mise e (to a shop) | nomi ni (to have a drink) | dekaketemangana. (have gone out, you know.) (This is spoken in Kansai dialect and accent in Japan) |
| 3 | Kusakimo nemuru ushimitsudoki ni (In the dead of night,) | Taro-kun to (Taro and) | Hanako-san ga (Hanako) | taue ni ikimashita. (went rice planting.) | Taro-kun wa (Taro) | koujou e (to a factory) | satsuei ni (for filming purposes) | Hanako-san wa (Hanako) | Hyakka-ten e (to a depart-ment store) | kaimono ni (for shop-ping) | dekaketoruken. (have gone out.) (This is spoken in dialect and accent of Shikoku and Kyushu districts in Japan) |
| 4 | Yama no anata no sora touku (Over the mountains, for to travel,) | kumasan to (a bruin and) | Kitsune ga (a fox) | ryokou ni ikimashita. (took a trip.) | kumasan wa (The bruin) | ki no ue e (to the top of a tree) | hirune ni (to have a nap) | Kitsune wa (the fox) | 2-chome ni (to 2-chome) | eiga o mini (to see a movie) | dekaketorubai. (have gone out.) (This is spoken in Kyushu dialect and accent in Japan) |
| ⋮ | ⋮ | ⋮ | ⋮ | ⋮ | ⋮ | ⋮ | ⋮ | ⋮ | ⋮ | ⋮ | ⋮ |

TELEPHONE NUMBER : 02-0102-3423

HOW TO ARRANGE THE TELEPHONE NUMBER : IT SHOULD BE READ IN BACKWARD READING DIRECTION. 3243-2010-20

HOW CORRESPONDING DOUNDS ARE PRODUSED : Kusaki mo nemuru ushimitsudoki ni/watashi to/
kitsune ga/taue ni ikimashita./
Watashi wa/shokudo e/shibakari ni/
kitsune wa/kouyen e/sentaku ni/dekakemangana.

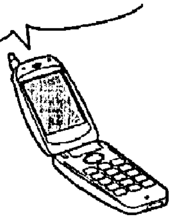

(C)

TELEPHONE NUMBER : 03-1413-0211

HOW TO ARRANGE THE TELEPHONE NUMBER : IT SHOULD BE READ IN BACKWARD READING DIRECTION. 1120-3141-30

HOW CORRESPONDING DOUNDS ARE PRODUSED : Obake-yashiki ni/otohsan to/Suzuki-san ga/
sunde imashita./
Otohsan wa/koujou e/souji ni/
Suzuki-san wa/2-chome ni/asobi ni/dekaketoruken.

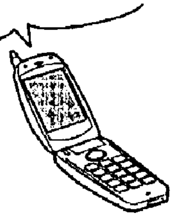

| 8 BARS | 4 BARS | 3 BARS | 2 BARS | 1 BAR |
|---|---|---|---|---|
| a) C ～ C<br>b) C ～ G7<br>c) E♭～E♭<br>d) E♭～ G7 | e) C ～ C<br>f) C ～ G7 | e) C ～ C | h) G7～ C | i) C |

(B)

YOSHIHIKO SANO (13 LETTERS)

13 = 8 + 4 + 1

C～C + C～G7 + C
(8 BARS) (4 BARS) (1 BAR)

(C)

たけいさんはていあんどていのしやちようさんです (23 LETTERS)

23 = 8 + 8 + 4 +3

C～C + E♭～G7 + C～G7 + C～C
(8 BARS) (8 BARS) (4 BARS) (3 BARS)

REPRESENTATION GENERATION METHOD, REPRESENTATION GENERATION DEVICE, AND REPRESENTATION GENERATION SYSTEM

FIELD OF THE INVENTION

The present invention relates to a representation generation method, a representation generation device and a representation generation system, by which a unique representation(s), such as music and/or images, is/are added to a specific information including a telephone number and/or a name for example.

BACKGROUND ARTS

It has been a common everyday practice to customize a terminal, such as a cellular phone or PC (personal computer), by selecting a desired one of music or images recorded or stored in that terminal and using it for a particular operation of the terminal. For example, the cellular phone may be customized by setting its operation so as to automatically change a ringing melody of incoming call in response to each call of each different caller. Recently, due to the prevalence of networks, typically known as Internet, as well as to the improvements of its transmission speed, an increasing number of various systems for providing music and/or images via the networks have been made available. As a result thereof, every user of the terminal or cellular phone can download a desired piece of the music and use it as a melody of incoming call to be ringed in his or her cellular phone, or can download a desired image for use as a wallpaper on his or her PC or as a stand-by mode image in his or her cellular phone.

However, in the case where a desired data is selected from data recorded in the terminal, the number of the data recorded therein is limited, and thus, a user can not completely use different data for each of callers who gives a call to him or her. Further, an ordinary music data available only contains known existing music, which results in the user being unable to enjoy an originality of music. For those reasons, there will be the need for individual user to create a desired music, if he or she wishes to use a desired representation(s), such as music and/or images, that can fulfill his or her own purposes. But, even in that case, the user must have a certain technical knowledge or expertise sufficient to deal therewith, and therefore anyone can not easily create a desired representation.

With the above-stated shortcomings in view, it is a purpose of the present invention to provide a representation generation method, a representation generation device, and a representation generation system, which are capable of generating a unique representation, such as music and/or images full of originality, in relation to a specific information, while being relatively low in costs.

DISCLOSURE OF THE INVENTION

In order to achieve the foregoing purpose, in accordance with the present invention, there is provided a representation generation process for generating data of unique representation(s), which uses a material table(s) in which material data associated with representation(s) are stored and accumulated in memory in such a manner as to allow the material data to be provided in relation to each of specific data included in a predetermined specific data sequence, and is characterized by including: a step of acquiring the predetermined specific data sequence; a step of extracting the material data from the material table(s) in relation to each of specific data included in the thus-acquired specific data sequence; and a step of arranging the thus-extracted material data in an order in which the specific data are sequenced, so as to generate data of representation(s). It should be noted that the foregoing and another purposes, features, and advantages of the present invention will become more specifically apparent from the detailed description hereinafter, with reference to the annexed drawings.

BRIEF DESCRIPTION OF THE DRAWINGS

FIG. 4(A)-(D) shows diagrams for explanatorily showing telephone numbers and specific examples of musical representation relative to the respective telephone numbers.

FIG. 7(A)-(C) shows diagrams showing one example of data table associated with narration phrases in an Embodiment 3 of the present invention.

FIG. 9(A)-(C) shows diagrams for explanatorily showing how to prepare material data of music in an Embodiment 5 of the present invention.

BEST EMBODIMENT FOR CARRYING OUT THE INVENTION

While the present invention may be embodied in a large number of ways, hereinafter, an appropriate number of exemplary embodiments of the invention will be selected and a specific description will now be made thereof.

SUMMARY OF THE INVENTION

The present invention contemplates on generating a unique and original representation(s) in relation to a specific data sequence. The term, "specific data sequence", is defined hereby to include words, symbols, numerals, or the like, which may, for example, include a name, a telephone number, a mail address, a birthday, a postal address, a sentence, and so forth. The term, "representation", is defined hereby to include a music, a narration, images (still images or moving images), and a combination of those materials (e.g. a rap which is a combination of music and words), and so forth. For example, a music may be applied to a telephone number or mail address, thereby increasing the possibility of realizing various ways of entertainments in relation to an individual people's specific data sequence.

Now, this inventive concept will be summarized by taking a telephone number as one example thereof, wherein the telephone number consists of 10-digit numbers or so. In that case, a table of "material data" is provided in advance, which lists a plurality of material data such that each material data corresponds to each of the digits and numerals of the telephone number. The term, "material data", refers to "unit of representation (or a part of representation)". For instance, in the case of music, a material data refers to one tone row having a length substantially equal to one breath. In this regard, an appropriate magnitude of such one tone row may be such that arranging a certain number of the tone rows in a given order produces a proper series of musical compositions. And now, some pieces of the thus-defined "material data" are extracted from a table in which the "material data" are provided in relation to the telephone number. Then, by arranging such extracted pieces of material data in a given order, it is possible to generate a certain unique representation in relation to the telephone number. In other words, some prepared "units of representation", i.e. some prepared pieces of "material data", may be arranged in association with a certain information so as to create and accumulate new representations that can be used to indicate various specific modes of representations.

Embodiment 1

Hereinafter, an exemplary embodiment of the present invention will be specifically described. First of all, with reference to FIGS. 1 to 4, an embodiment 1 of the invention will be described. In this embodiment, a description will be made of the case where the a telephone number is used as a specific information or data, and a music is created or generated as an example of generating a unique representation in relation to the telephone number.

Figure 1:
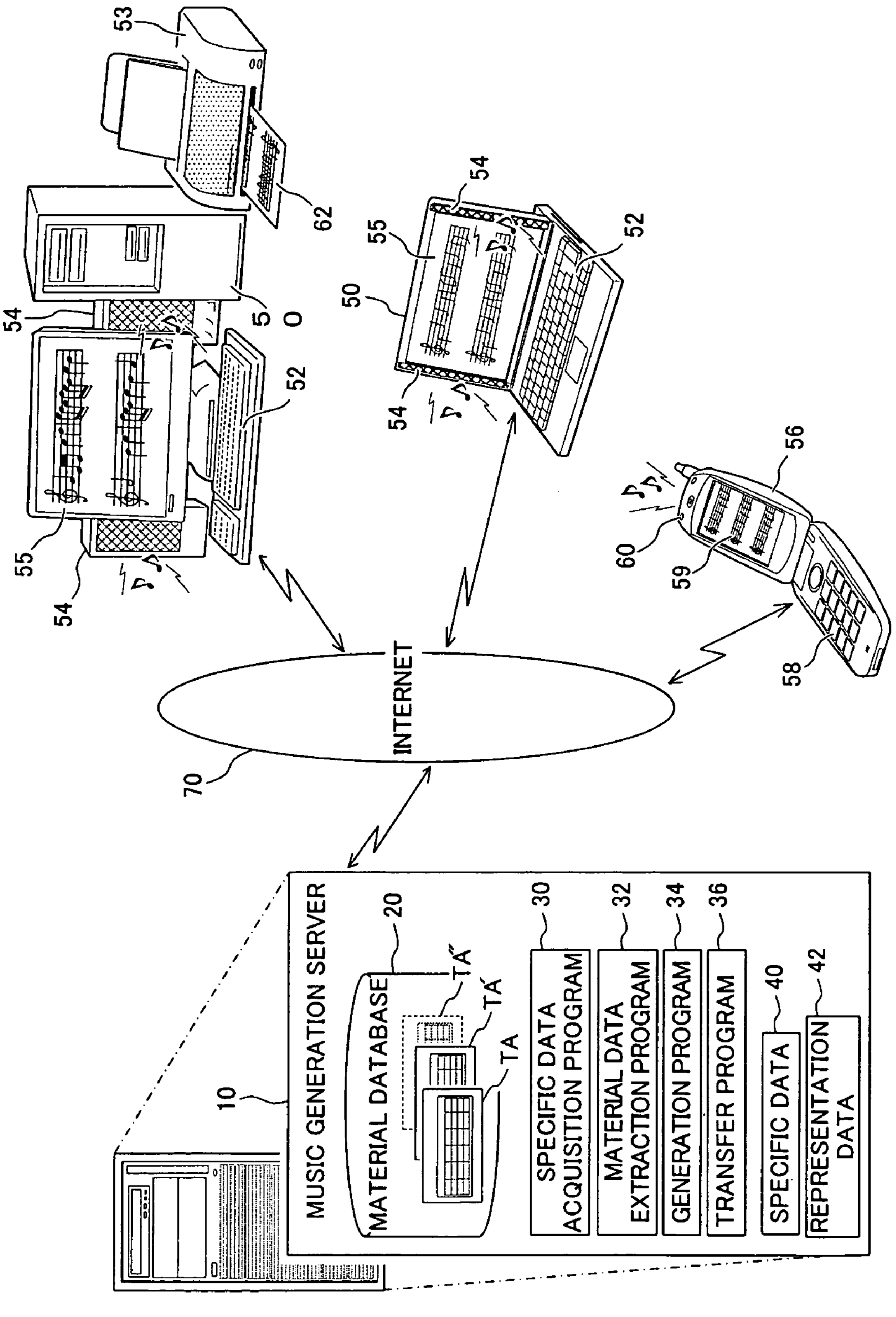
FIG. 1 is a diagram illustrating the arrangement and configuration of a system used in an Embodiment 1 of the present invention.

(1) Arrangement and configuration of system . . . FIG. 1 illustrates a whole of arrangement and configuration of a system for transmitting or wire distributing music in accordance with the present embodiment. As shown in that figure, the present system is so constructed as to have a MA server 10 as a central unit, the MA server being connected with an Internet 70 and also connected with a PC (i.e. a personal computer) and a cellular phone 56 which are each owned by a user. In general, a plurality of those PCs 50 and cellular phones 56 are actually used. As can be seen from the FIG. 1, providers and many other servers are omitted.

At first, a description will be made of the music generation server 10. This music generation server 10 is provided with:

① a material database 20 in which are accumulated in memory a great number of material data associated with music;

② a specific information acquisition program 30 for allowing a specific data sequence (i.e. a telephone number in the present embodiment) to be obtained or acquired by a user(s);

③ a material data extraction program 32 for causing some of the material data to be extracted from the afore-said material database 20 in relation to a telephone number that has been acquired by the afore-said specific information acquisition program 30;

④ a generation program 34 for causing the data extracted by such material data extraction program 32 to be arranged one by one in a predetermined order and thereby causing generation of a data for one piece of music (which contains a musical performance data and a musical score data); and ⑤ a transfer program 36 for transferring or transmitting such music data generated by the generation program 34 to the side of the user.

Further, the server 10 includes a memory area for storing the following data:

⑥ a specific data 40 which is included individually in the specific data sequence acquired by the foregoing specific data acquisition program 30; and ⑦ a representation data 42 associated with the foregoing music generated by the foregoing generation program 34.

Among those elements, the material database 20 includes some material tables TA, TA', TA" . . . and so forth stored and accumulated in memory, wherein, in each of those material tables, a certain material data MD on a certain music is given in each of grids of the table which are defined by rows indicating the numerals of a telephone number and columns indicating the digits of the telephone number, so that a desired one of that material data may be selected at a cross-matched point where a particular pertinent one of the rows or telephone number numerals is cross-matched with the corresponding pertinent one of the columns or telephone number digits. FIG. 2(A) shows one example of the material table TA. In this particular material table TA, the numerals, i.e. 0 to 9, are given in an interrelationship with the respective digits of telephone number (normally, a 10-digit or 11-digit number), and representations, which are each expressed by one of the symbols [1-0] to [10-9](or to [11-9]), are given in the respective grid of table among the numerals and digits of telephone number. According to the present embodiment, each of such representations, [1-0] to [10-9], refers to one phrase of music (i.e. one unit which is for example equal to one bar or a short breath). For example, if the numeral corresponding to the 3rd digit, say "3", is "5" in the telephone number, then a corresponding phrase of music will be set as [3-5].

In this connection, one example of how to prepare the material data DA will be explained. Suppose now that the telephone number is a preset 10-digit number for instance. Then, a progression of the music will have to be set in accordance with the 10 digits in the sequence of telephone number. While the progression of music may be set in any desired manner, it is preferable that the music should progress in terms of a chord progression based on principles of functional harmony, with a view to achieving a good and sweet music acceptable by people. This is indeed preferred for creating music to wide ranges of users. Specifically, suppose that a chord progression is applied to the 10-digit number in accordance with the following predetermined steps: ① a dominant chord is followed by a tonic chord; ② any desired sort of chord is followed by a tonic chord; and ③ the chord progression ends up with a tonic chord. In that case, for example, the chord progression may be set as follows:

For 1st digit number . . . T (tonic chord)
For 2nd digit number . . . DD (double dominant chord)
For 3rd digit number . . . D (dominant chord)
For 4th digit number . . . T
For 5th digit number . . . SD (subdominant chord)
For 6th digit number . . . T
For 7th digit number . . . DD
For 8th digit number . . . D
For 9th digit number . . . T/D
For 10th digit number . . . T In this context, for example, a practical chord progression based on the foregoing steps may be set as follows: C→D7→G7→C→F→C→D7→G7→C or G7→C.

Then, in accordance with the thus-arranged chord progression, 10 kinds of phrases corresponding to the respective numerals 0 to 9 be provided as material data MD. Such phrases may be prepared by a composer or by selecting some parts of copyright-free musical compositions. In view of the 10-digit number on this case, a total of 100 phrases will have to be prepared, which may be used to create the material table TA. As shown in FIG. 2(B), one material data MD corresponding to each of the thus-prepared phrases contains a musical performance data PD and a musical score data SD. With regard to the musical performance data PD, the file form thereof may be MIDI, WAVE, or other suitable file form. On the other hand, the file form for the musical score data SD corresponding to the performance data PD, which forms the phrase, may be an image file (e.g. in the file form of GIF, JPEG, PDF and so forth) or a musical score file of SDF form for use on a scoring software or the like. It is noted that, while the musical performance data PD and musical score data SD are provided independently of each other in this embodiment, the material data MD may be formed in one single file of a suitable form for enabling both of musical performance and score indication. As required, a plurality of the material tables MT classified by different categories may be provided. For example, different material tables MT be prepared for each of the following musical genres: classical music, jazz, Latin, etc. . . . , for each of the following places: Tokyo, Kyoto, Osaka, etc. . . . , or for each of the following ages; 10's, 20's, 30's, etc. . . . .

Next, the specific data acquisition program 30 is a program for causing indication on the screen of an input guidance image for data acquisition where a user can acquire (or input) a specific data sequence and thereby allowing the user to designate a specific data 40 and obtain the same. The specific data or telephone number may be a telephone number of the user or a telephone number of an acquaintance of the user's. In this respect, the program may be designed to skip indication of the input guidance image and directly cause automatic acquisition of the telephone number of the user who has dialed thereby. Instead of the telephone number, the program be designed to allow a user to use and designate a particular musical genre, a particular local area, or the like.

The material data extraction program 32 is a program for causing extraction of some pieces of material data MD from the respective material tables TA, . . . which are stored in the material database 20, wherein such pieces of material data MD correspond to the respective music phrases selected from the table in relation to the numerals and digits of the telephone number which has been acquired as above. The generation program 4 is a program for causing the thus-extracted material data MD to be arranged one by one in a predetermined order and thereby causing generation of a data of one complete piece of musical composition. In this program, the arrangement of material data MD may be set in normal reading order of the telephone number in which a user reads the number in a normal direction, or in backward reading order of the telephone number in which the user reads the number in a backward direction opposite to the normal direction. In this regard, the program may be so designed that the local area code of the telephone number is omitted, and an initial numeral of the remaining dialing code portion is set at the 1st digit of the telephone number, thereby leaving the remaining dialing code portion as it is. This remaining dialing code portion may be arranged in either the normal reading direction or the backward reading direction. Further, alternatively, the arrangement of the material data be set in a certain order designated by the user when executing the specific data acquisition program 30. The transfer program 36 is a program for transferring or wire distributing a representation data 42 on the thus-generated musical composition to the user's PC 50 or cellular phone 56 via the Internet 70. It is noted here that the representation data may be recorded on a CD-ROM or other recording means, depending upon its size, and then, such recording means be delivered to the user.

On the other hand, the user's PC 50 and cellular phone 56 are provided with a keyboard 52 and buttons 58, respectively, as an input means, and also provided with speakers 54 and a speaker 60, respectively, as an output means for outputting a reproduced music. The user's PC 50 and cellular phone 56 are further provided with the respective display portions 55 and 59 each being adapted to indicate various information and images on the screen. As required, the PC 50 may be provided with a printer 53 for printing out the information and images indicated on the display portion thereof. Further, those PC 50 and cellular phone 56 are operable for gaining access to the music generation server 10 over the Internet 70. In this regard, needless to say, the user may gain access to the server by means of other communication device, such as a hand-held terminal or PHS.

Figure 3:
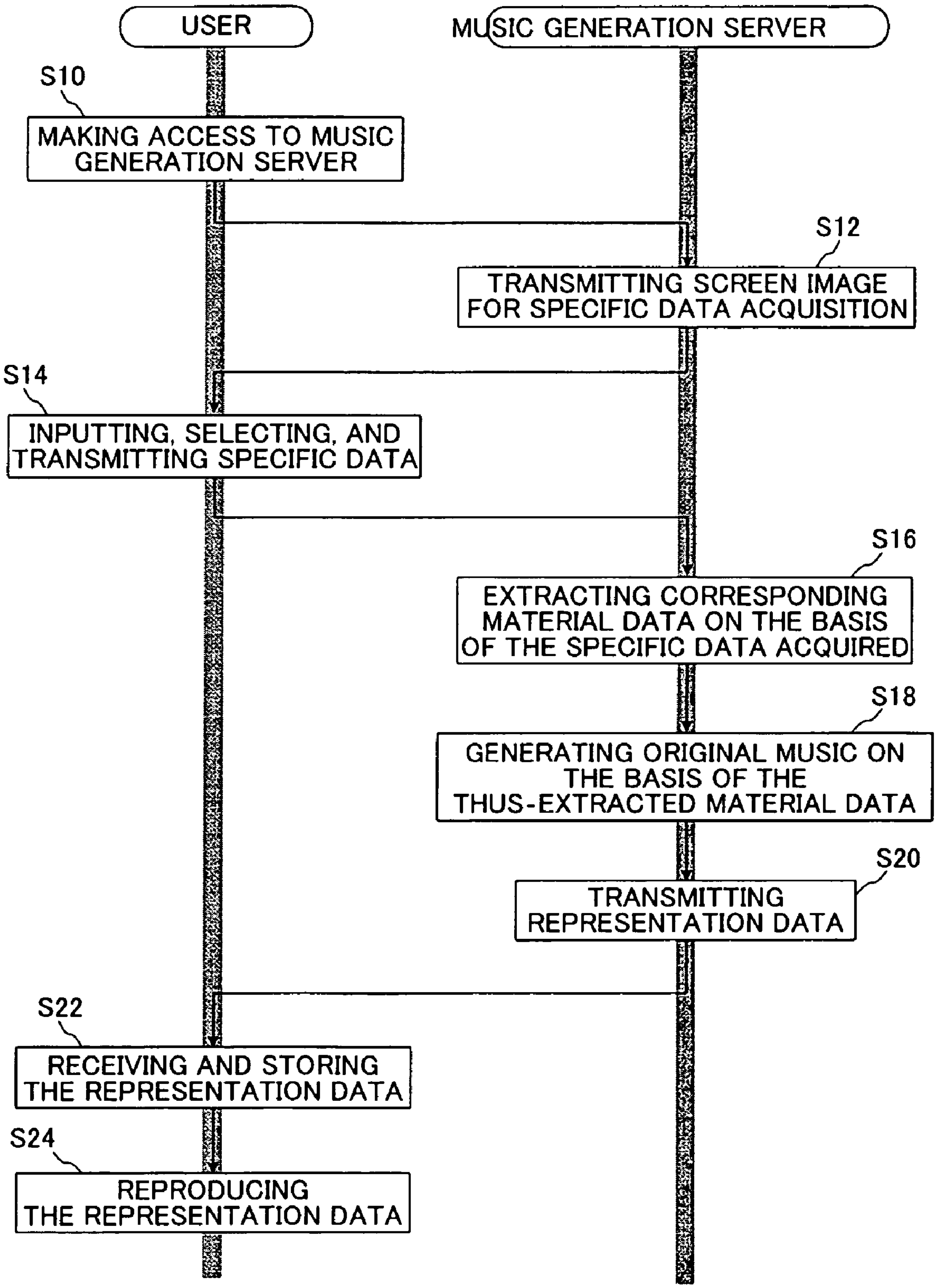
FIG. 3 is a sequence diagram showing operation of the foregoing Embodiment 1.

(2) Operation of the system . . . . Next, referring to FIG. 3 as well, operation of the present embodiment will be described. The FIG. 3 illustrates principal steps of the operation in this embodiment. In this particular embodiment, a description will be made of processes from the step of acquiring a music corresponding to a certain telephone number to the final step of using the music as a melody of incoming call to be ringed in the cellular phone. At first, the user operates his or her cellular phone 56 to make access to the music generation server 10 through the Internet 70 (Step S10). Responsive thereto, the music generation server 10 executes authentication to the user, as required, and thereafter, transmits to the user a screen image for specific data acquisition via the Internet 70, wherein the screen image allows the user to input a telephone number therein (Step S12).

On the user's side, such screen image is indicated on the display portion 59 of the cellular phone 56 in order that the user can input the telephone number or the like therein. The telephone number to be inputted in the screen image may be the user's telephone number, or the telephone number of the user's acquaintance or the like. At the same time, the user may also select a desired one of conditions for generating music, such as a desired genre of music to be generated. When the user depresses a "send" button after having inputted information in the screen image, a data forming a certain specific data sequence is transmitted to the music generation server 10 (Step S14).

Then, the music generation server 10 first executes the material data extraction program 32 on the basis of the specific data 40 obtained from the user, thereby referencing the material table TA, and extracting therefrom each of corresponding pieces of material data MD on music phrases at each relevant cross-matched point, as described above, where the pertinent digit of the inputted telephone number is cross-matched with the corresponding pertinent numeral of the telephone number in the table (Step S16). At this point, for example, if a certain genre of the music is designated, another material table corresponding to that music genre is used. Also, if the telephone number inputted is a 10-digit number, then 10 pieces of material data will be extracted. Thereafter, the representation generation program 34 is executed, by which the thus-extracted pieces of material data MD are arranged in a given order so as to create one piece of completed musical composition or a piece of original music (Step S18). It is noted that the thus-generated data of original music contains a musical performance data and a musical score data therein.

Upon the transfer program 36 being executed, such finally generated music data is transmitted as a representation data 42 to the user's side through the Internet 70 (Step S20). The representation data 42 is received by the user's cellular phone 56 which in turn stores that data in a not-shown memory thereof or the like (Step S22). Then, a melody, which is reproduced on the basis of that representation data, is outputted from the speaker 60, while a musical score corresponding to such reproduced melody is indicated on the display portion 59 (Step S24). The user may set the thus-obtained original music data as a melody of incoming call which is to be ringed in the cellular phone 56. In place of the cellular phone 56 used for obtaining the original music in this example, the PC 50 may of course be used for that purpose. The PC 50 is operable to cause the printer 53 to print out an image file on the musical score indicated on the display portion 55 thereof, thereby outputting a musical score 62. Alternatively, with this system, the user may obtain some pieces of original music in relation to each of different telephone numbers of his or her acquaintances, and set those pieces of original music as incoming call melodies for the respective telephone numbers, so that the user can identify each of his or her acquaintances by listening to the corresponding incoming call melody ringing in the cellular phone.

Figure 2:
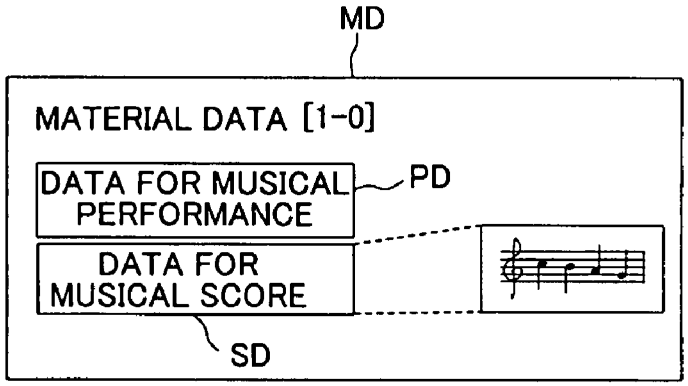
FIGS. 2(A) and (B) shows a diagram illustrating one example of a material table containing music phrases in relation to the digits and numerals of telephone number and also showing one example of a material data.

(3) Specific examples . . . . FIG. 4 shows specific examples illustrative of the above-described processes of the present system for generating some pieces of musical compositions in correspondence with each of the specific data sequences. Now, the example shown in (A) of the FIG. 4 refers to the case where the telephone number used is “03-5447-5166” and corresponding number of music phrases of that telephone number are arranged in a normal reading direction of telephone number. For example, suppose that the material table TA shown in FIG. 2 is used, and that some pieces of material data MD are extracted from the material table at the respective cross-matched points where the ten digits of the telephone number “03-5447-5166” are cross-matched with the respective corresponding ten numerals of that particular telephone number in the table. Then, all pieces of the thus-extracted material data MD are arranged in normal direction, wish the result that all representations corresponding thereto are arranged such that [1-0]-[2-3]-[3-5]-[4-4]-[5-4]-[6-7]-[7-5]-[8-1]-[9-6]-[10-6].

An example shown in (B) of the FIG. 4 refers to the case where the telephone number used is the same as above, but it is arranged in backward reading direction. That is, the telephone number reads backwardly as follows: “6615-7445-30”, and in that case, all representations corresponding thereto can be arranged such that [1-6]-[2-6]-[3-1]-[4-5]-[5-7]-[6-4]-[7-4]-[8-5]-[9-3]-[10-0]. In this connection, in the case of the (A) of FIG. 4, a user lives in one of the wards of Tokyo, and thus, the local area code of his or her telephone number is “03” ahead of its whole dialing code, as a result of which, a same first passage of ringing melody comes out for all the telephone numbers. Further, in the case of cellular phone or PHS, the telephone number thereof begins with the following fixed code: “090” or “070”, and thus, if it is applied to the foregoing case of the (A) of FIG. 4, a same first passage of melody will come out for all the telephone numbers. But, as described above, such problem is solved by the backward reading arrangement of telephone number in the present embodiment.

An example shown in (C) of the FIG. 4 also suggests a way to differentiate the first passages of melodies, as similar to the foregoing embodiment. For example, suppose that the cellular phone number is “090-3260-4289” and the material data corresponding thereto is to be arranged on the condition that “the dialing code portion thereof, excepting the 090, should read in order form the initial numeral of the dialing code followed by that 090.”. In that case, the sequence of dialing code is: “3260-4289”, and therefore, all representations corresponding to the respective dialing code numerals may be arranged such that [1-3]-[2-2]-[3-6]-[4-0]-[5-4]-[6-2]-[7-8]-[8-9]. It is no such arrangement of representations by the generation program 34 may be effected as one of preset routines in that particular generation program 34, or may be effected when instruction is given by a user on the basis of the specific data acquisition program 30.

An example shown in (D) of the FIG. 4 refers to the case where the local area code of telephone number, commonly used in a particular local area, is also used for an intended purpose. For example, a material table containing melodies of Japanesque music (e.g. a material table TA') is now provided, and such material table is applied to the local area code “075” of Kyoto. Then, corresponding pieces of material data MD to the respective dialing code numerals following that local area code “075” are extracted from the table and arranged in order. In this respect, for example, if the telephone number used is “075-549-5162”, all representations corresponding to the respective dial code numerals of that telephone number following the code 076 will be arranged such that [1-5]-[2-4]-[3-9]-[4-5]-[5-1]-[6-6]-[7-2]. Accordingly, a music material suggestive of a certain local area may be provided, so that a call recipient who listens to a melody of incoming call can roughly recognize the local area where a caller lives, who is telephoning to the call recipient.

(4) Effects of the Embodiments . . . . As appreciated from the foregoing description, according to the present embodiments, various music phrases can be combined together in relation to a telephone number so as to provide a unique music with elements of surprise and full of originality to a caller or a call recipient, which is effectively used as a sound signaling an incoming call in the cellular phone and other devices. At the same time, a musical score data for such unique music can be provided, so that anyone can obtain the score data and use it for his or her own musical performance or the like. Further, in preparing music phrases, a smooth and stable chord progression can be set in correspondence with digits found in a sequence of a known number, whereby it is possible to create proper music phrases in accordance with such smooth chord progression and thus provide a good and sweet music which is acceptable by a wide range of users. Furthermore, in the case where all of telephone numbers to be used begin with a same initial code portion, one of the following additional processing may be effected: a processing for omitting such same initial code portion, a processing for arranging each telephone number in backward reading direction, and a processing for using that particular same initial code portion as a means for giving a distinctive characteristic. Accordingly, it is possible to create different characteristics for different telephone numbers, or to use a common code portion in telephone numbers as a distinctive element.

Embodiment 2

Figure 5:
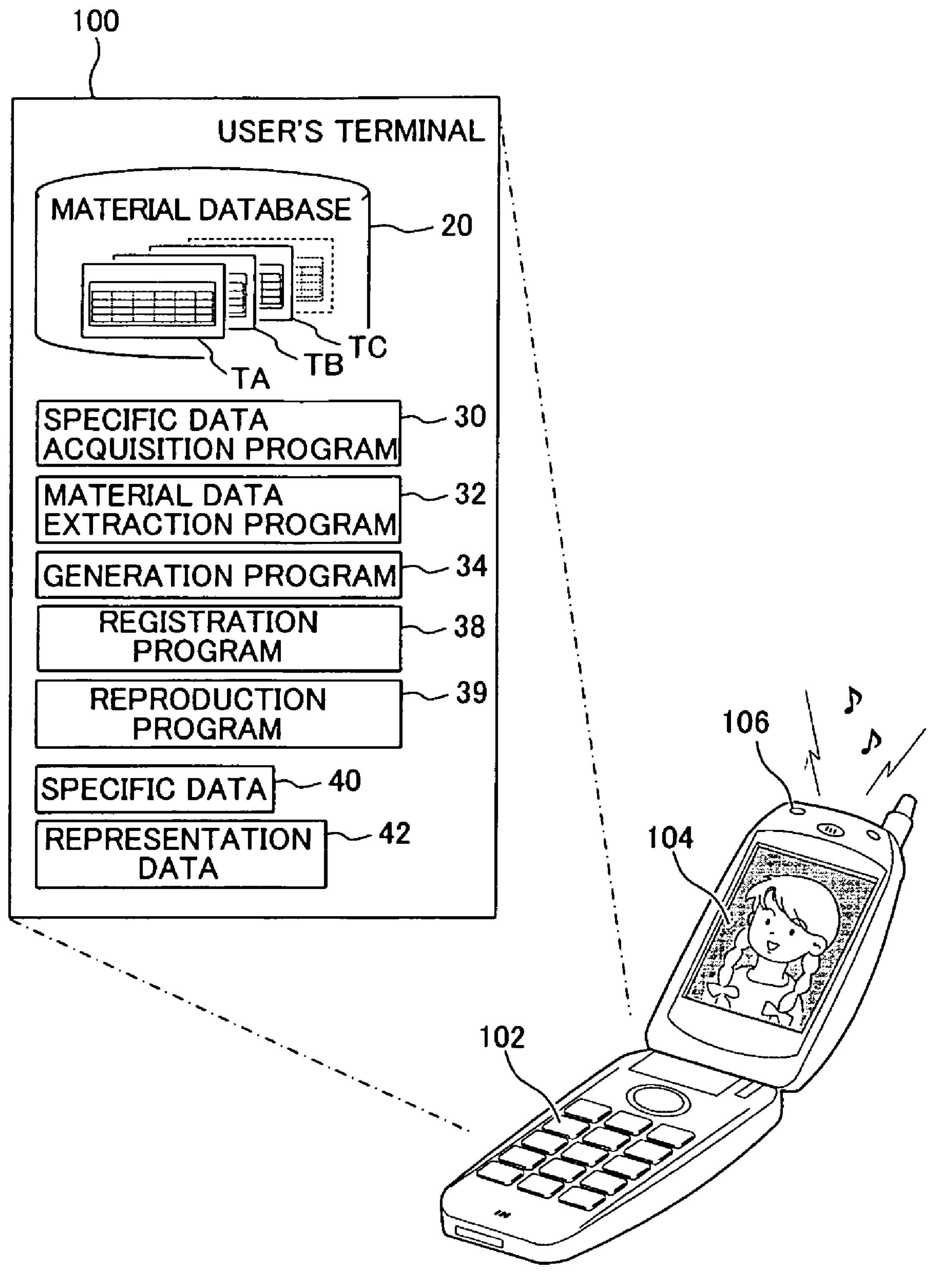
FIG. 5 is a diagram showing the arrangement and configuration of a system in an Embodiment 2 of the present invention.
Figure 6:
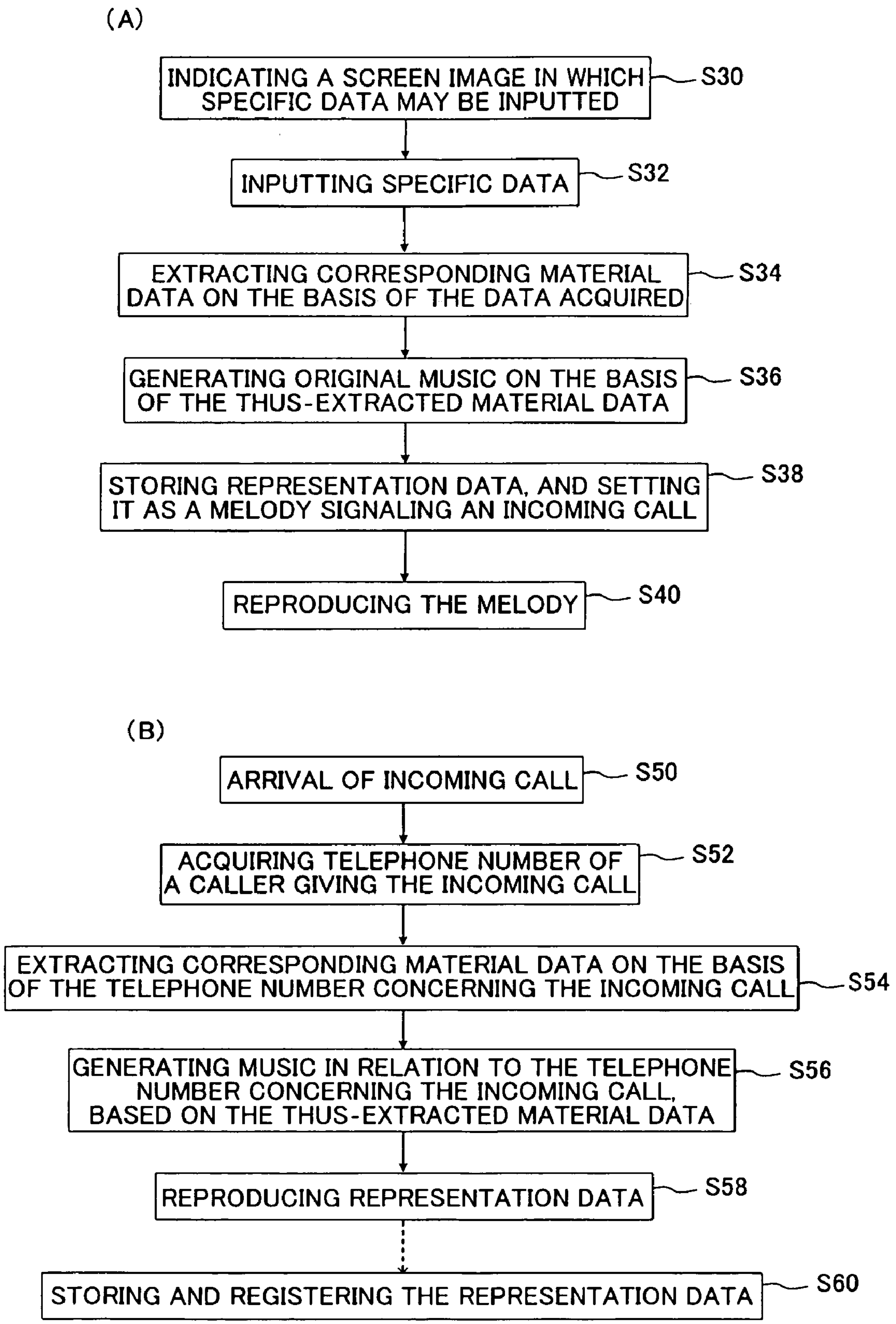
FIGS. 6(A) and (B) shows sequence diagrams each showing operation of the foregoing Embodiment 2.

Next, with reference to FIGS. 5 and 6, a description will be made of the Embodiment 2 of the present invention, FIG. 5 illustrates an arrangement and configuration of a system in accordance with the present embodiment, and FIG. 6 shows principal steps of operation of the system. It is noted that the designations given in the foregoing Embodiment 1 will be reused for all the constituent elements to be described hereinafter, which are identical to or correspond to those of the Embodiment 1. Instead of the Embodiment 1 wherein a user has to obtain an original music from the music generation server 10 through the Internet 70, the present embodiment relates to the case where an original music can be generated only by user's operation of his or her own terminal to process specific information.

The user's terminal or a cellular phone 100 shown in FIG. 5 is provided with: buttons 102 as an inputting means for inputting or setting various kinds of data and parameters; a display portion 104 for indicating various kinds of information and/or images on the screen; and a speaker 106 for outputting sounds or the like therefrom. The arrangement and configuration of system in the cellular phone are basically similar to those of the music generation server 10 in the previously described Embodiment 1, and includes: a material database 20; a specific data acquisition program 30; a material data extraction program 32; and a generation program 34. In the present embodiment, a registration program 38 and a reproduction program 39 are provided in place of the transfer program 36. The registration program 38 is a program for causing a data, such as a music which was once generated, to be stored in a memory (not shown). The reproduction program 39 is a program for causing the generated data to output from the speaker 106 in the case where such generated data relates to music, or causing the generated data to appear on the display portion 104 in the case where the generated data relates to image. But, with regard to the specific data 40 and representation data 42, they are similar to those of the foregoing Embodiment 1.

According to the present embodiment, the material database 20 is provided with a material table TA in which, likewise as in the foregoing Embodiment 1, plural pieces of material data MD for music phrases are stored and accumulated in memory. Other material tables TB and TC will be explained specifically later. Those material tables TA, TB, TC, etc. . . . may initially be stored in memory within a cellular phone 100 when a user purchases that particular cellular phone, or may be downloaded thereto from a server which provides the material data.

Next, referring to FIG. 6, an operation of the present embodiment will be explained. At first, reference being made to FIG. 6(A), a description will be made of the case where a user sets a telephone number as a specific data to cause generation of an original music. Now, the user first effects a required operation to execute the specific data acquisition program 30, and then, that specific data acquisition program 30 is executed to cause indication on the display portion 104 of a screen image where a specific data sequence, such as telephone number(s), can be inputted (Step S30). At this stage, the user may operate the control portions, such as the buttons 102, of the phone, to designate the specific data sequence therein, which is, for example, done by inputting his or her telephone number or a telephone number of his or her acquaintance, or by selecting a desired one of the telephone numbers entered in an address book or the like of the cellular telephone 100 (Step S32).

Upon the specific data sequence being designated in that way, the material data extraction program 32 is executed to extract material data MD associated with music from the material table TA (see the illustration of FIG. 2 stated above), wherein the material data MD are each selected at the corresponding cross-matched point where the pertinent digit of telephone number is cross-matched with the corresponding pertinent numeral of the telephone number, in the table (Step S34). Then, the generation program 34 is executed to cause the thus-extracted material data MD to be arranged in a predetermined order, thereby generating one piece of data for an original music (Step S36). At this point, with regard to the order in which the material data it to be arranged, there are various ways to set such order, likewise as in the previously described Embodiment 1. The data thus generated is stored in memory by the registration program 38 and set as a melody of incoming call or the like (Step S38). Thereafter, the generation program 39 is executed, thereby reproducing a representation data 42, so that a melody is outputted from the speaker 106 (Step S40). In this respect, if the representation data 42 contains a musical performance data and a musical score data likewise as in the previously described embodiment, it may be arranged such that a musical score of the melody being reproduced is indicated on the display portion.

The effects of the present embodiment are basically similar to those of the previously described embodiment, but, in the present embodiment, it is possible to obtain an original music in an easier and more free way, without communication with a server or the like. Moreover, as shown in FIG. 6(B), the cellular phone 100 may also be provided with a generation function for automatically generating and reproducing music upon arrival of an incoming call.

When the cellular phone 100 receives an incoming call (Step S50), the specific data acquisition program 30 is executed to acquire a telephone number of a caller giving the call (Step S52), and then, the material data extraction program 32 is executed responsive to the thus-acquired telephone number, so that material data MD on music, which correspond to that particular telephone number, are extracted from the material table TA (Step S54). Then, by execution of the generation program 34, the thus-extracted material data MD are arranged one by one in a certain order, so that a music data is generated in relation to the telephone number of the caller who has given the incoming call (Step S56). The music data so generated is outputted from the speaker 106 by execution of the reproduction program 39 (Step S58). After then, if required, such music data may be stored in memory by execution of the registration program 38 (Step 60). It is noted here that, while a certain series of the extracted material data MD are put together to form one music data sequence in that way, it may yet be so arranged that, each time one material data or phrase is extracted relative to corresponding one numeral of the telephone number, a corresponding piece of music is outputted, such that plural pieces of music are outputted sequentially as a whole.

Accordingly, in the present embodiment, an original melody can be generated automatically upon arrival of an incoming call. Thus, there is eliminated the necessity to generate a melody and store it for registration in the cellular phone in advance before receiving a corresponding incoming call, and additionally, even a sight-impaired person can identify a caller who calls to him or her, depending on each of corresponding melodies of incoming calls. This means that a barrier-free function can be provided.

Embodiment 3

Next, referring to FIG. 7, a description will be made of the Embodiment 3. The arrangement, operation and effects of system according to the present embodiment are basically identical to those of the foregoing Embodiment 2, except that a narration is to be generated, instead of music, in this particular embodiment. The material database 20 of the cellular phone 100 (see FIG. 5) is provided with a material table TB in which a material data MD associated with a narration phrase is given in each of the grids of the table which are defined by rows indicating the numerals of a telephone number and columns indicating the digits of the telephone number, wherein a desired one of that material data may be selected at a corresponding cross-matched point, as described earlier, where a pertinent one of the rows or the telephone number numerals is cross-matched with the corresponding pertinent one of the columns or the telephone number digits.

FIG. 7(A) shows one example of the foregoing material table TB. In this particular example, to facilitate the ease of understanding, the contents of the material table TB are shown to be arranged in the order in which all pieces of the material data MD are finally arranged. According to the shown example, all pieces of the material data MD are arranged in the order of the following digits of telephone number: 10th digit→9th digit→8th digit→7th digit→(9th digit)→6th digit→5th digit→(8th digit)→4th digit→3rd digit→2nd digit+1st digit. With respect to each of those digits, a certain narration phrase is provided at each cross-matched point in the table where the pertinent one of the 10 digits is cross-matched with one of the numerals 0 to 9. For example, with respect to the 10th digit only, formation of the table may be such that, for the corresponding numeral "0", a Japanese phrase "Mukashi aru tokoro ni" (which means: "Once upon a time, at a certain place,") is given; for the corresponding numeral "1", a Japanese phrase "Obake-yashiki ni" (which means: "At a haunted house,") is given; for the corresponding numeral "2", a Japanese phrase "Aru hareta hi ni" (which means: "On a fine day,") is given; for the corresponding numeral "3", a Japanese phrase "Kusakimo nemuru ushimitsudoki ni" (which means: "In the dead of night") is given; for the corresponding numeral "4", a Japanese phrase "Yama no anatano sora touku" (which means: "Over the mountains, far to travel,", a part of old German poet made by Carl Busse) is given, and so forth . . . , as shown.

Likewise as in the previously described Embodiment 2, the present embodiment may also be arranged such that a user can input a telephone number in his or her own way so as to cause generation of a unique narration, and that the narration can be generated and reproduced automatically upon arrival of an incoming call.

Referring further to FIG. 7(B) and 7(C), another specific example will now be explained. At first, according to the example shown in the FIG. 7(B), a telephone number "02-0102-3423" is given, and arrangement of material data relative thereto is based on the following backward reading of the telephone number: "3243-2010-20". Thus, a narration outputted from the speaker 106 will read as follows: "Kusaki mo nemuru ushimitsudoki ni (which means: "In the dead of night")/watashi to (which means: "I and")/kitsune ga (which means: "a fox")/taue ni ikimasita. (which means: "went rice planting.")/Watashi wa (which means "I")/shokudou e (which means: "to a restaurant")/shibakari ni (which means: "to mow a lawn")/kitsune wa (which means: "fox")/sentaku ni (which means: "for washing")/dekaketemangana (which means: "has went out, you know", which is roughly spoken in a dialect and accent peculiar to the Kansai region in Japan.)".

According to the example shown in the FIG. 7(C), a telephone number "03-1413-0211" is given, and then, arrangement of corresponding pieces of material data is based on the following backward reading of such telephone number: "1120-3141-30". In that case, a narration to be reproduced may be set as follows: "Obake-yashiki ni (which means: "In a haunted house,")/otohsan to (which means: "father and")/Suzuki-san ga (which means: "Mr. Suzuki")/sunde imasita. (which means: "had lived".)/Otohsan wa (which means: "Father")/koujou e (which means: "to a factory")/souji ni (which means: "for cleaning")/Suzuki-san wa (which means: "Mr. Suzuki")/2-chome ni (which means: "to 2-chome")/asobi ni (which means: "to have some fun")/dekaketoruken. (which means "have went out." which is spoken in a dialect and accent of Shikoku and Kyushu districts in Japan.)". In the present embodiment, some phrases may be prepared in a certain dialect according to each of the relevant regions and provided in the material table, so that the thus-prepared phrases can be used, or a particular program may be provided, which is designed to subject a material data to dialect word processing. That is, for example, if a local area code of telephone number used by a caller is "02", a narration will be generated and reproduced in Tohoku dialect and accent (i.e. dialect and accent used in the Tohoku district of Japan), or if the caller's local area code is "05", a narration be generated and reproduced in Nagoya dialect and accent (i.e. dialect and accent used in Nagoya and its vicinity in Japan). Accordingly, in this embodiment, by combining together words and clauses which are prepared by sampling or voice synthesis, it is possible to reproduce a unique narration to either of a caller and a call recipient.

Embodiment 4

Figure 8:
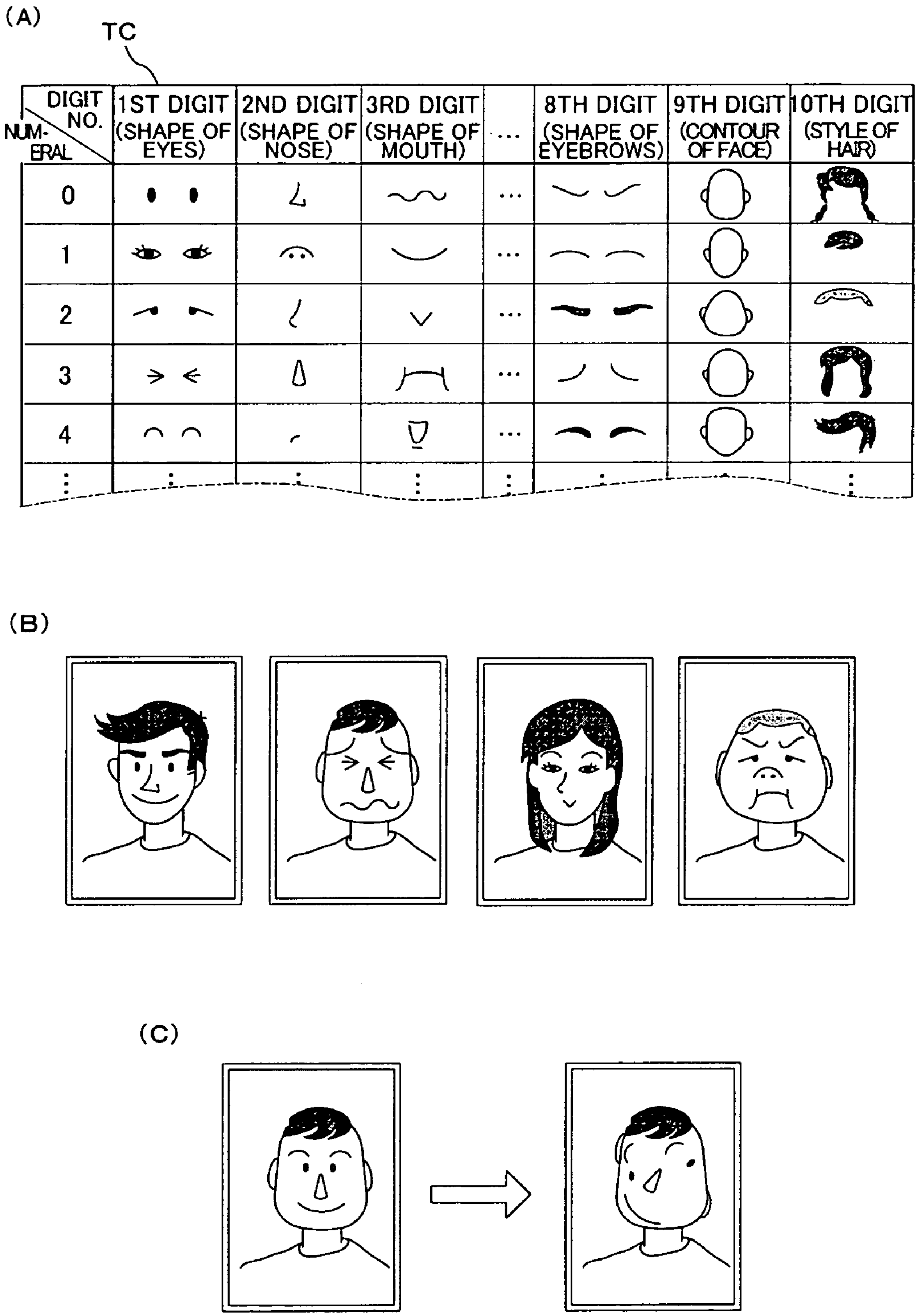
FIG. 8 shows diagrams concerning an Embodiment 4 of the present invention, wherein (A) of this figure is a diagram showing one example of material table associated with parts for forming a human face, wherein (B) of this figure shows specific examples of generated images of characters, and wherein (C) of this figure shows another examples in the present embodiment.

Next, referring to FIG. 8, a description will be made of Embodiment 4 of the present invention. While all the foregoing embodiments deal with generation of unique representations relative to sound, such as a music or narration, the present embodiment is directed to generating unique images relative to specific information or data. The arrangement and configuration of system in this particular embodiment is similar to that of the previously described Embodiment 2, except that its material database 20 stores a material table TC where a plurality of material data MD are given in relation to the digits and numerals of telephone number.

FIG. 8(A) shows one example of the foregoing material table TC. According to such example of table shown in that figure, parts for forming a face of human are set in relation to the respective digits of telephone number. Namely, with regard to such parts for forming human face, for example, the 1st digit of telephone number is categorized as "shape of eyes", the 2nd digit thereof categorized as "shape of nose", the 3rd digit thereof categorized as "shape of mouth", . . . , the 8th digit thereof categorized as "shape of eyebrows", the 9th digit thereof categorized as "contour of face", and the 10th digit thereof categorized as "style of hair". Accordingly, as understandable from the figure, 10 sorts of material data MD, which correspond to the respective parts categorized above, may be provided with respect to each of the numerals 0 to 9.

Then, in the same way as described in the foregoing Embodiment 2, a desired number of the foregoing parts are selected in relation to a given telephone number and arranged in such a manner that each of the parts is located at a predetermined position, whereupon, as shown in FIG. 8(B), it is possible to form an appropriate image of face in relation to the corresponding telephone number. It is noted in the present embodiment that the afore-said predetermined positions at which the parts are to be located respectively should be set by the generation program 34. An image of face so generated is indicated on the display 104 by execution of the reproduction program 39.

As described above, according to the present embodiment, it is possible to create a unique image by combining together selected parts of the foregoing parts in relation to a specific telephone number, thereby enabling a user to identify a particular caller by watching a corresponding image which appears on the screen when the caller's incoming call arrives. While a telephone number is used in this embodiment to create an image of face, a mail address may be used as a specific data sequence, and an image(s) to be created may include animal(s), insect(s), fish(es), or imaginary landscape(s). Further, a unique image of a certain character may be used, which is to be transmitted to either of a caller and a call recipient, and such image be indicated not only on the display screen of cellular phone, but also on the display monitor of PC or other hand-held terminal.

Additionally, by way of another alternative example in the present embodiment, only "localized portions of human face" may be set with respect to the respective digits of telephone number, such that the 1st digit of telephone number is categorized as "eyes", the 2nd digit thereof categorized as "nose", the 3rd digit thereof categorized as "mouth", . . . and so forth. Such "localized portions of human face" may be indicated as some preset limited images, or as selected images that a user has selected from among a plurality of different images of face localized portions provided beforehand. But, in this embodiment, the localized portions of human face must be set relative to the digits of telephone number only, and can never be changed for any numeral of telephone number, and, under such condition, another category, "position and direction", is set for each of the "localized portions of human face" and defined differently according to each of numerals 0 to 9 of telephone number. For example, in the category of "eyes", the position and direction of eyes may be changed differently for each of those numerals, such that "eyes are relatively close to each other", "eyes are relatively distant from each other", "eyes are slanted downwardly", "eyes are located near to the eyebrows", . . . or the like. Based on such conditions, each of the "localized portions of human face" may be relocated and arranged from its normal position in relation to a particular telephone number, whereby, as seen in FIG. 8(C) for instance, it is possible to cause indication on the screen of a particular facial expression which varies according to each different telephone number of each different caller upon arrival of an incoming call form the caller. Hence, by watching an image of character's facial expression indicated on the screen, a user can identify a caller associated therewith.

Embodiment 5

Next, referring to FIG. 9, a description will be made of the Embodiment 5. In the foregoing embodiments, a telephone number is used; that is, only a numerical character is used as a specific data sequence and the number of digits of the telephone number is fixed in advance. But, in accordance with the present invention. It is also possible to use and process letters such as alphabetical letters or Japanese hiragana letters in the same manner as described above about the numerical characters. Further, it is possible to use and process other sort of specific data sequence, such as name, address or sentence, which can not be clearly categorized or defined by digits and numerals. Moreover, in the present embodiment, it is possible to use and process even a character sequence which is indefinite or unfixed in the number of letters given therein. FIG. 9 shows diagrams for selecting and setting material data about music phrases.

Now, suppose that a unique music is generated in relation to a specific data sequence that can not be defined in terms of digits and number of letters beforehand. In that case, as shown in FIG. 9(A) for instance, the first step is to musically provide 8 bars, 4 bars, 3 bars, 2 bars and 1 bar, and prepare a certain chord progression in each of those bars beforehand, Thereafter, a digit number or number of letters in a given letter sequence is divided by 8, and then, the remainder produced therefrom may be classified as follows: "4+0," "4+1," "4+2," and "4+3." Then, if the letter sequence consists of some alphabetical letters selected from all alphabetical letters "A to Z", then 26 pieces of material data MD or 26 music phrases may be provided in correspondence with the respective 26 alphabetical letters, wherein each of those phrases contains different chords. Or, if the letter sequence consists of some Japanese hiragana letters selected form all the Japanese hiragana letters "あ to ん", then required pieces of different material data or required number of different phrases may be provided in correspondence with the respective different Japanese hiragana letters "あ to ん". In such Japanese hiragana letters, there are other sorts of Japanese hiragana letters each with a dot mark of voiced sound or the like, in which case, additional phrases may be provided therefor, respectively.

For example, as shown in (B) of the FIG. 9, in the case where a name "YOSHIHIKO SANO" is given, which has 13 letters, the following definition may be set: "13=8+4+1". In that name, the initial sequence of 8 letters, "YOSHIHIK", may correspond to 8 bars musically, and a proper music phrase corresponding to each of those 8 letters be extracted from music phrases prepared along chords based on the following chord progression: "C~G7", so that all the music phrases may be prepared within the 8 bars. Then, the next sequence of 4 letters, "OSAN", may correspond to 4 bars, and thus, a proper music phrase corresponding to each of those 4 letters be extracted from music phrases prepared along chords based on the following chord progression: "C to G7", so that all the music phrases may be prepared within the 4 bars. Finally, the last letter "O" may correspond to 1 bar, and therefore, a proper music phrase corresponding to such letter "O" is extracted from music phrases prepared on the basis of chord "C". Then, those extracted music phrases may be put together appropriately to optimize a corresponding chord progression and at the same time generate a musically completed tune.

Further, as shown in FIG. (C) of the FIG. 9, a unique music may be composed in relation to a particular sentence. A sentence shown in that figure by way example is prepared in Japanese hiragana letters as follows: "たけいさんはていあんどていのしゃちょうさんです" (which means: "Mr. Takei is the president of T & T."), and it has 23 letters. In that case, the following definition may be set: "23=8+8+4+3", and for example, a chord progression in accordance therewith may be arranged such that "C~C (8 bars)"→"E♭~G7 (8 bars)"→"C~G7 (4 bars)"→"C~C (3 bars)". With respect to each of the chords, a required number of music phrases or material data MD, which are equal to all the number of Japanese hiragana letters, may be prepared in advance, and, from the thus-prepared material data MD, some appropriate music phrases be extracted therefrom in accordance with a particular reading way in which such specific data sequence as the foregoing Japanese hiragana sentence are read. Accordingly, in the present embodiment, it is possible to generate a unique music in relation to a particular specific data sequence formed by numeral or letter sequence that can not be divided into digits or the like.

Another Embodiment

A large number of another embodiment may be realized in the present invention and therefore it is possible to modify the invention in various ways on the basis of the foregoing descriptions. Among them, for instance, there may be included the following embodiments:

(1) Instead of the above-described embodiments wherein music, narration and images are created in relation to numerical sequence and letter sequence, it is possible in the present invention to use and process other various specific data sequences, such as mail address, postal address, name, birthday, memorial day, bank account number, index number of car, sentence, or a combination of number, letter and symbol. In particular, a high confidential sentence or a private information data may be used as such specific data sequence so as to encrypt any information associated with a secret matter.

(2) Another mode of representation that can be generated in the present invention include a combination of music, images and narration, for instance, Such combination of different representations makes it possible to explore a widest possible range of entertainment. Also, the present invention may be applied to various genres of music, such as HIP-HOP, JAZZ, or CLASSICAL MUSIC. Further, if it is desired to compose a tune for a birthday, any suitable music material for giving an atmosphere of celebration to the birthday can be used. Still further, it is possible to create various versions of one and same piece of music, in which case, for example, a normal version, a Beetles-like version, and a Bach-like version can be created therefor. Or, an arrangement function for arranging that piece of music may be provided in the program of the system of the present invention, in which case, of course, all required symbols indicative of the arrangement may be contained in a musical score data corresponding to that particular piece of music. In the case of images to be created, it is not limited to images of characters, but any other sorts of images, such as fishes, animals, insects, or scenery, may be created. Furthermore, in the case of narration, it is possible to use a voice of famous people which is collected by sampling, a laughable speech or sentence come up with by a novelist or essayist, thereby giving an added value to the narration. Further, a nation, a chronological aspect, a gender and the like may be taken into consideration in preparing the material data. For example, the material data may contain a Beetles-like tune for people of the Beatles generation, a folk-like tune for people of the folk song golden ages, . . . and so forth. In addition, the material data MD may be prepared on the basis of chord progression, likewise as in the Embodiment 1, but, this is just one example and any other suitable method be employed insofar as it provides a smooth and stable progression of music.

(3) Instead of the previously described embodiments wherein the data generated in this system is used mainly for a melody of incoming call or stand-by image in cellular phone, such data may be incorporated in a word processing software or mailer software so as to set a configuration for allowing use of an original melody or images relative to a mail address and/or name.

(4) The material phrases extracted from the material tables may be synthesized so as to provide one phrase file and then a piece of music be created on the basis thereof. Or, the material phrases be reproduced one by one in sequence. For example, it may be arranged such that material phrases being extracted in a given order are reproduced from one by one on the side of PC 50 while being downloaded thereto, in contrast to the Embodiment 1 wherein the representation data 42 covering one piece of music are all reproduced before being sent to the side of PC 50. In this regard, even if the representation data 42 covering one piece of music are all reproduced before being sent to the PC, it may be arranged such that, upon receipt of the representation data 42, a streaming is effected on the side of PC 50 to start reproducing a part of that representation data being received by the PC prior to all of the data being received thereby.

(5) While, in all of the previously described embodiments, an original representation data is to be generated in correspondence with one specific data sequence, the system may be so arranged as to generate an original representation data with respect to a plurality of specific data sequences. In this case, such plurality of specific data sequences may be processed appropriately so as to provide one new specific data sequence, whereby an original representation data can be generated in correspondence with such one new specific data sequence. For example, in the case of an affianced couple having their own telephone numbers, it may be so arranged that those telephone numbers are subjected to an appropriate arithmetic processing, such as addition, subtraction multiplication and division, so as to generate a new data sequence (i.e. a numeric sequence in this case), and then, the above-described processes are effected appropriately on the basis of such new data sequence so as to generate an image of face of a child which can be recognized commonly by the affiance couple.

(6) The operations of the embodiments thus described are each of an exemplary nature, and therefore may be embodied by any other appropriate process and step to attain the same effects and advantages as described above. For example, while, in the foregoing Embodiment 1, a musical score is indicated on the display portion, simultaneously with reproduction of a generated music data, it may be arranged such that, when the generated music data is reproduced, other image than the musical score image is indicated on the display portion, and, if needed, a data of the musical score image can be read out from memory or the like, so that the musical score image is indicated on the screen or outputted. Further, the systems used in the embodiments may be modified in any other appropriate manner to attain the same effects and advantages as described above. For example, while, in the foregoing embodiments, the music data has been defined as a data containing a musical performance data and a musical score data therein, it may be arranged such that the music data only contains the musical performance data.

APPLICABILITY FOR INDUSTRIAL USE

As described above, the present invention has the effect of enabling addition of a unique representation with elements of surprise and full of originality to a specific data sequence including letters and/or numbers.

The invention claimed is:

1. A representation generation process for generating data of unique representation(s), which uses: specific data included in a predetermined specific data sequence; and a material table(s) in which material data associated with a representation(s) are stored and accumulated in such a manner as to allow said material data to be provided in relation to each of specific data included in said predetermined specific data sequence in accordance with an order in which the specific data are sequenced in the predetermined specific data sequence, said process being characterized by including:

a step of acquiring said predetermined specific data sequence;

a step of extracting said material data from said material table(s) in relation to said each of specific data included in the thus-acquired specific data sequence; and a step of arranging the thus-extracted material data in which said specific data are sequenced in said predetermined specific data sequence, so as to generate data of representation(s), providing the generated data of representation(s) to a user.

2. A representation generation process for generating data of unique representation(s), which uses: specific data included in a predetermined specific data sequence; and a material table(s) in which a material data associated with a representation(s) is stored and accumulated, in such a manner as to allow said material data to be provided in relation to each of specific data included in said predetermined specific data sequence in accordance with an order in which the specific data are sequenced in the predetermined specific data sequence, said process being characterized by including:

a step of acquiring said specific data sequence from a user through network;

a step of extracting said material data from said material table(s) in relation to said each of specific data included in the thus-acquired specific data sequence;

a step of arranging the thus-extracted material data in which said specific data are sequenced in said predetermined specific data sequence, so as to generate data of representation(s); and a step of providing the thus-generated data of representation(s) to said user.

3. A representation generation device for generating data of representation(s) in relation to a predetermined specific data sequence including specific data, which is characterized by being provided with:

a material table(s) in which material data associated with a representation(s) are stored and accumulated in such a manner as to allow said material data to be provided in relation to each of said specific data sequence in accordance with an order in which the specific data are sequenced in the predetermined specific data sequence;

a data acquisition means for acquiring said specific data sequence;

a material data extraction means for extracting said material data from said material table(s) in relation to each of specific data included in the thus-acquired specific data sequence; and a data generation means for arranging the thus-extracted material data in said order in which said specific data are sequenced in said predetermined specific data sequence, so as to generate data of representation(s), providing the generated data of representation(s) to a user.

4. The representation generation device as set forth in claim 3, which is characterized by being provided with a reproduction means for reproducing a representation(s) on basis of said data of representation(s) generated by said data generation means.

5. The representation generation device as set forth in claim 3, which is characterized in that said data generation means is workable to arrange said extracted material data in such a manner as to allow said data of representation(s) to be generated in a different way with respect to each of a plurality of said specific data sequences.

6. The representation generation device as set forth in claim 3, which is characterized in that said material data is/are data associated with sound or images.

7. The representation generation device as set forth in claim 6, which is characterized in that, in case of said material data being data associated with music, said material data is prepared in such a manner as to attain a smooth and stable progression of said music.

8. The representation generation device as set forth in claim 7, which is characterized in that said material data contains a musical performance data associated with said music and a musical score data corresponding to the music.

9. The representation generation device as set forth in claim 3, which is characterized in that said representation data comprises either a sequence of plurality of said material data or a combination of the plurality of said material data.

10. The representation generation device as set forth in claim 3, which is characterized in that said specific data sequence is acquired through network, while said representation data is provided through the network.

11. A representation generation system characterized by including said representation generation device set forth in claim 3 as a server.

12. A representation generation system characterized by including said representation generation device set forth in claim 3 as a terminal.

13. The representation generation device as set forth in claim 4, which is characterized in that said data generation means is workable to arrange said extracted material data in such a manner as to allow said data of representation(s) to be generated in a different way with respect to each of a plurality of said specific data sequences.

14. The representation generation device as set forth in claim 4, which is characterized in that said material data is/are data associated with sound or images.

15. The representation generation device as set forth in claim 5, which is characterized in that said material data is/are data associated with sound or images.

16. The representation generation device as set forth in claim 4, which is characterized in that said representation data comprises either a sequence of plurality of said material data or a combination of the plurality of said material data.

17. The representation generation device as set forth in claim 5, which is characterized in that said representation data comprises either a sequence of plurality of said material data or a combination of the plurality of said material data.

18. The representation generation device as set forth in claim 6, which is characterized in that said representation data comprises either a sequence of plurality of said material data or a combination of the plurality of said material data.

19. The representation generation device as set forth in claim 7, which is characterized in that said representation data comprises either a sequence of plurality of said material data or a combination of the plurality of said material data.

20. The representation generation device as set forth in claim 8, which is characterized in that said representation data comprises either a sequence of plurality of said material data or a combination of the plurality of said material data.

21. The representation generation device as set forth in claim 4, which is characterized in that said specific data sequence is acquired through network, while said representation data is provided through the network.

22. The representation generation device as set forth in claim 5, which is characterized in that said specific data sequence is acquired through network, while said representation data is provided through the network.

23. The representation generation device as set forth in claim 6, which is characterized in that said specific data sequence is acquired through network, while said representation data is provided through the network.

24. The representation generation device as set forth in claim 7, which is characterized in that said specific data sequence is acquired through network, while said representation data is provided through the network.

25. The representation generation device as set forth in claim 8, which is characterized in that said specific data sequence is acquired through network, while said representation data is provided through the network.

26. The representation generation device as set forth in claim 9, which is characterized in that said specific data sequence is acquired through network, while said representation data is provided through the network.

27. A representation generation system characterized by including said representation generation device set forth in claim 4 as a server.

28. A representation generation system characterized by including said representation generation device set forth in claim 5 as a server.

29. A representation generation system characterized by including said representation generation device set forth in claim 6 as a server.

30. A representation generation system characterized by including said representation generation device set forth in claim 7 as a server.

31. A representation generation system characterized by including said representation generation device set forth in claim 8 as a server.

32. A representation generation system characterized by including said representation generation device set forth in claim 9 as a server.

33. A representation generation system characterized by including said representation generation device set forth in claim 10 as a server.

34. A representation generation system characterized by including said representation generation device set forth in claim 4 as a terminal.

35. A representation generation system characterized by including said representation generation device set forth in claim 5 as a terminal.

36. A representation generation system characterized by including said representation generation device set forth in claim 6 as a terminal.

37. A representation generation system characterized by including said representation generation device set forth in claim 7 as a terminal.

38. A representation generation system characterized by including said representation generation device set forth in claim 8 as a terminal.

39. A representation generation system characterized by including said representation generation device set forth in claim 9 as a terminal.

40. A representation generation system characterized by including said representation generation device set forth in claim 10 as a terminal.

* * * * *